(12) United States Patent
Prasad et al.

(10) Patent No.: US 11,685,266 B2
(45) Date of Patent: Jun. 27, 2023

(54) BATTERY ELECTRIC SYSTEM HAVING SWITCHABLE ARCHITECTURE WITH THERMAL RUNAWAY PROTECTION

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US); Robert J. Heydel, Clawson, MI (US); Russell K. Steele, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/463,703

(22) Filed: Sep. 1, 2021

(65) Prior Publication Data

US 2023/0068153 A1 Mar. 2, 2023

(51) Int. Cl.
*B60L 50/60* (2019.01)
*H02J 7/00* (2006.01)

(52) U.S. Cl.
CPC ............ *B60L 50/60* (2019.02); *H02J 7/0013* (2013.01); *H02J 7/0029* (2013.01); *H02J 7/00032* (2020.01)

(58) Field of Classification Search
CPC ..... B60L 50/60; H02J 7/00032; H02J 7/0013; H02J 7/0029
See application file for complete search history.

(56) References Cited

U.S. PATENT DOCUMENTS

2009/0206679 A1\* 8/2009 King ................. B60L 58/22
307/125
2020/0274203 A1\* 8/2020 Kirleis ............... H01M 10/482

\* cited by examiner

*Primary Examiner* — Carlos Amaya
(74) *Attorney, Agent, or Firm* — Quinn IP Law

(57) ABSTRACT

A rechargeable energy storage system (RESS) includes a battery controller and battery modules, each respective module having battery cells, a cell sense board, and a semiconductor switch. The switch is connected in parallel with the cells within the respective module, and configured to conduct an electrical current during a thermal runaway propagation (TRP) event in which one or more cells is in an open-circuit state. This action bypasses the module and enables electrical components to be powered by the RESS during the TRP event. A battery electric system includes a direct current ("DC") voltage bus, an electrical component connected thereto, the battery controller, and the RESS. A method for constructing the RESS includes connecting a respective semiconductor switch in parallel with the at least one battery cell of each respective one of the multiple battery modules, and electrically connecting the multiple battery modules together to construct the RESS.

20 Claims, 4 Drawing Sheets

BATTERY ELECTRIC SYSTEM HAVING SWITCHABLE ARCHITECTURE WITH THERMAL RUNAWAY PROTECTION

INTRODUCTION

Battery electric systems are used to store or furnish electrical power in a host of power-generating or power-consuming devices. For example, an electric powertrain typically includes a rechargeable energy storage system (RESS) and one or more electric machines, with the electric machine(s) being constructed from a wound stator and a magnetic rotor. When an electric machine in an electric powertrain functions as a propulsion motor, switching control of the ON/OFF states of individual semiconductor switches within a traction power inverter module (TPIM) generates an alternating current (AC) output voltage at a level suitable for energizing conductors forming the stator windings.

An RESS used for powering the above-described electric machine(s) for the purpose of automotive propulsion or other high-voltage applications is typically equipped with an application-suitable number of electrochemical battery cells, e.g., 8-16 cells/stack, which are arranged in individual battery modules and mounted onto a chassis via a support tray. A standard lithium-ion battery cell, for instance, encloses conductive electrodes, an electrolyte material, and a permeable separator within an electrically-insulated foil pouch or other suitable packaging. The battery cells are electrically connected in a series or parallel arrangement, e.g., using an electrical interconnect board (ICB), while a Battery Control Module (BCM) regulates opening and closing of battery pack contactors and resident switches to govern the ongoing operation of the battery pack. As significant heat is often generated during sustained operation of the RESS, the RESS is also cooled via an associated thermal management system, typically via conductive cooling plates, cooling fins, heat sinks, and/or circulation of a heat transfer fluid through the RESS.

SUMMARY

Described herein are methods and associated hardware solutions for providing a robust thermal runaway propagation (TRP) control response in a battery electric system having a rechargeable energy storage system (RESS). As generally described above, the RESS contemplated herein includes multiple battery modules, with each respective one of the battery modules constructed from one or more constituent electrochemical battery cells. Also disclosed herein is a mobile platform using the aforementioned battery electric system. In the various disclosed embodiments, automatic bypass is achieved for an open-circuit condition within the RESS, which may lead to a TRP event in which rapidly increasing heat from a faulted battery cell quickly spreads to one or more adjacent battery cells. A battery module having one or more battery cells experiencing such an open-circuit condition are hereinafter referred to as an "open module" for simplicity. Other solutions rely on active switching control to achieve a similar TRP control response, with a possible extension of the present teachings to a split-pack reconfigurable series-parallel RESS embodiment as set forth below.

During a representative TRP event, an open module typically results in large inrush currents through the bypass switches, a tripping of a mid-pack fuse and, a bypass of half of the RESS, or more precisely a bypass of the collective battery cells residing therein. As appreciated in the art, however, a 50V-bypassed battery pack or RESS is generally unable to power necessary loads for maintaining maximum cooling during the TRP event. Likewise, a substantial reduction in battery power may result in a loss of propulsion. The present teachings are therefore intended to ensure that, during a TRP event coinciding with an open module fault condition, a maximum available direct current (DC) bus voltage is provided to TRP-related systems or safety critical loads, such as but not limited to an electronic transmission range selector (ETRS) and active cooling systems such as chillers or heat exchangers, an auxiliary power module (APM), etc.

Aspects of the present disclosure include integrating diodes, e.g., Schottky diodes or other low voltage drop/low-loss diodes, into the individual battery modules to enable passive bypass of the particular battery module experiencing the open-circuit condition. Diode integration occurs at the module level, or possibly the battery cell level in some embodiments, with an overarching goal of maintaining adequate thermal regulation and limited propulsion functions during a TRP event that might have resulted in an open cell condition.

In other configurations, the low-loss diodes may be an integral component of controllable/active semiconductor switches, e.g., MOSFETs having gates powered by a gate driver circuit, such that the semiconductor switches are configured to act as active diodes with very low voltage drops, with such embodiments likewise enabling partial power propulsion modes.

An aspect of the present disclosure includes an RESS that is connectable to one or more electrical components. The RESS includes a battery controller and a plurality of battery modules. Each respective one of the battery modules includes one or more battery cells, a cell sense board (CSB) in communication with the battery controller and configured to measure and transmit a set of battery cell operating values thereto, and a semiconductor switch. The semiconductor switch, which is connected in parallel with the one or more battery cells within the respective battery module, is configured to conduct an electrical current during a TRP event in which the one or more battery cells of the respective battery module are in an open-circuit state. This action automatically bypasses the battery cell(s) having the open-circuit state while at the same time providing the electrical current to the one or more electrical components during the TRP event.

In a possible split-pack configuration of the RESS, the battery modules include a first plurality of battery modules arranged in a first battery pack and a second plurality of battery modules arranged in a second battery pack. The RESS is configured, using the semiconductor switch, to selectively connect the first and second battery packs in a series-connected configuration, and to selectively disconnect the first and second battery packs from each other in response to the open-circuit state.

A battery electric system is also disclosed herein. An embodiment of the battery electric system includes a DC voltage bus, at least one electrical component connected to the DC voltage bus, the battery controller, and the RESS, the latter of which is connected to the DC voltage bus.

The RESS in some configurations may be used aboard a motor vehicle having, as the at least one electrical component, an electric propulsion motor and an accessory load. The RESS comprises a solid-state relay positioned between the first and second battery packs noted above. In response to the open-circuit state in one of the first battery pack or the second battery pack, the battery controller is configured to isolate the first or second battery pack experiencing the open-circuit state, which the battery controller accomplishes by selectively opening the solid-state relay. The battery controller thereafter powers the accessory load and/or provides limited propulsion capabilities to the motor vehicle via the electric propulsion motor.

The at least one electrical component in some configurations includes an electric propulsion motor of a motor vehicle and a traction power inverter module (TPIM). In such a configuration, the semiconductor switch provides the electrical current to the electric propulsion motor via the TPIM for propulsion of the motor vehicle during the TRP event.

The least one electrical component may include a chiller system, an air conditioning control module (ACCM), and/or an auxiliary power module (APM), in which case the semiconductor switch provides the electrical current to the chiller system and/or the ACCM for thermal regulation of the battery electric system during the TRP event.

As summarized above, disclosed embodiments include first and second battery packs. The RESS in such a split-pack configuration, in response to a series mode selection signal from the battery controller, selectively connects the first and second battery packs in a series-connected configuration using the semiconductor switch. This enables, e.g., a DC fast-charging operation of the RESS.

Also disclosed herein is a method for constructing an RESS having multiple battery modules. Each of the battery modules has at least one battery cell. An embodiment of the method includes connecting a respective semiconductor switch in parallel with the at least one battery cell of each respective one of the multiple battery modules. The respective semiconductor switch is configured to conduct an electrical current during TRP events of the RESS in which the at least one battery cell of one of the multiple battery modules is in an open-circuit state, thereby automatically bypassing the battery module or cell(s) having the open-circuit state during the TRP event. The method includes electrically connecting the multiple battery modules together to construct the RESS.

The method may also include connecting a respective CSB to each of the multiple battery modules. The respective CSB is configured to measure and transmit a set of battery cell operating values to a battery controller in communication with the RESS.

Connecting the respective semiconductor switch in parallel with the at least one battery cell of each respective one of the multiple battery modules in some implementations includes arranging a solid-state relay, as the respective semiconductor switch, between a first battery pack and a second battery pack of the RESS. The solid-state relay is operable for connecting the first battery pack and the second battery pack in series to enable a DC fast-charging operation of the RESS.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
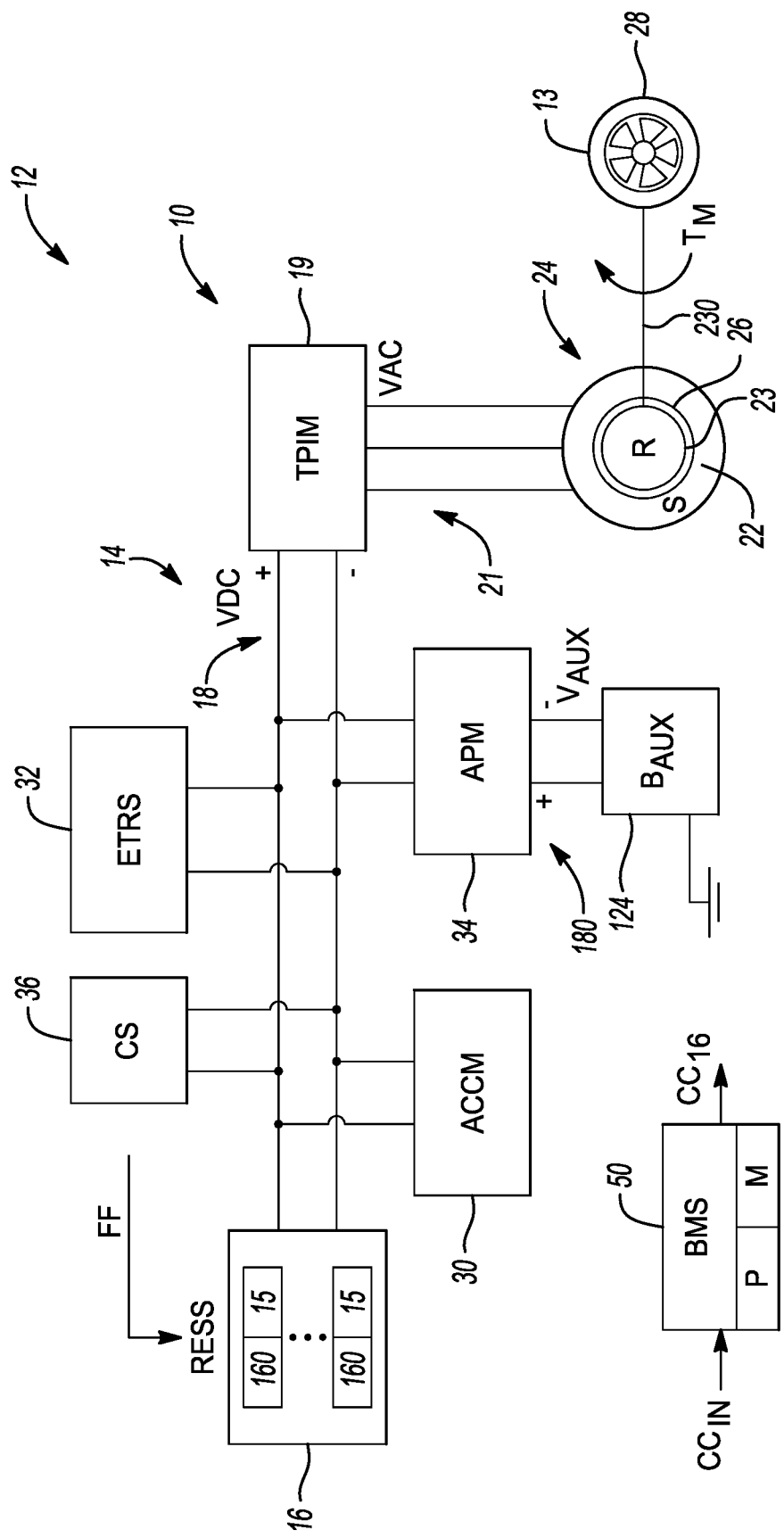
FIG. 1 is a schematic illustration of an exemplary motor vehicle having a battery electric system configured as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within ±5% of", or "within acceptable manufacturing tolerances", or logical combinations thereof.

Figure 2:
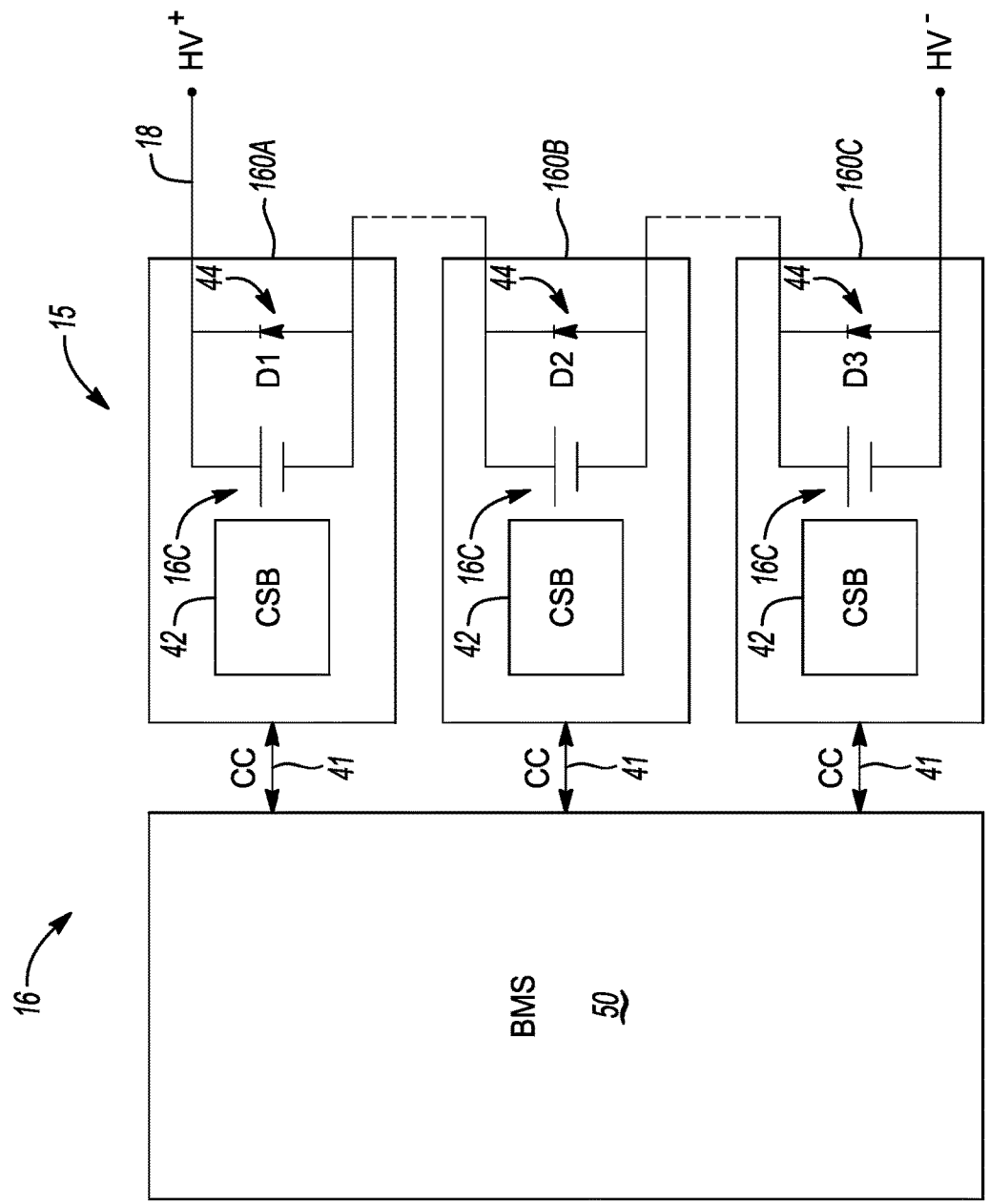
FIG. 2 is a schematic illustration of a rechargeable energy storage system (RESS) usable as part of the battery electric system shown in FIG. 1.
Figure 3:
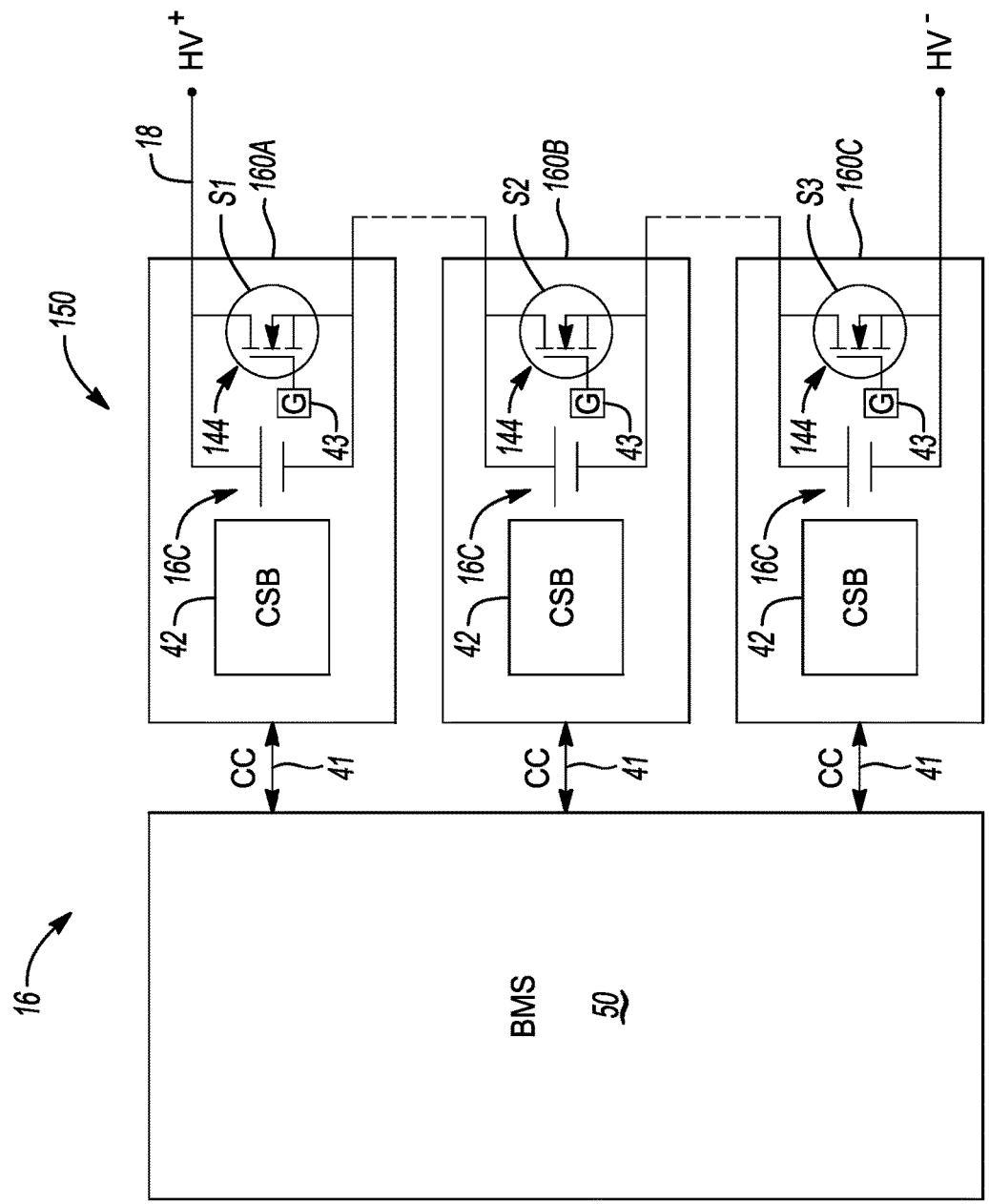
FIG. 3 is a schematic illustration of an alternative embodiment to that which is depicted in FIG. 2.
Figure 4:
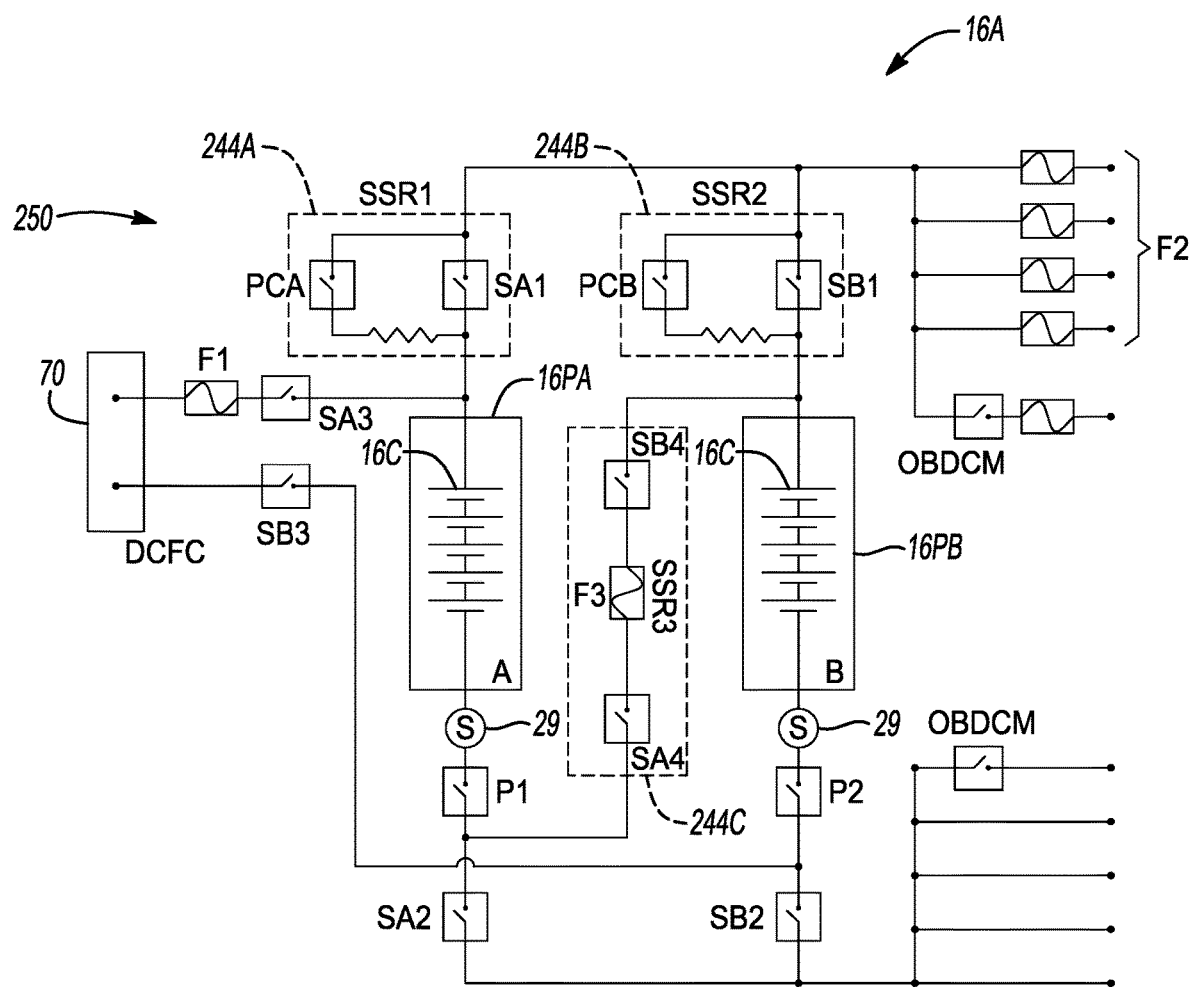
FIG. 4 is a schematic circuit diagram illustrating an alternative embodiment of the battery electric system shown in FIG. 2.

Referring to the drawings, wherein like reference numbers refer to the same or like components in the several Figures, an electric powertrain 10 is shown for use with a mobile platform 12, e.g., a motor vehicle having one or more road wheels 13 as shown, or alternatively a robot, boat, rail vehicle, etc. The electric powertrain 10 includes a battery electric system 14 having a rechargeable energy storage system (RESS) 16, with the RESS 16 including multiple battery modules 160. The battery modules 160 of the RESS 16 are respectively configured with a switchable architecture 15 that automatically bypasses an open module during a thermal runaway propagation (TRP) event of the type generally described above. Integration of the switchable architecture 15 into the battery modules 160 as described in detail below with reference to FIGS. 2-4 is intended to protect and preserve thermal regulation and, to the extent possible, propulsion functions of the electric powertrain 10. Thus, operation of the switchable architecture 15 enables requisite power to be delivered to one or more cooling-related and possibly propulsion-related systems or components of the mobile platform 12.

The battery modules 160 are constructed from one or more battery cells 16C (see FIGS. 2 and 3) each having an application-suitable lithium ion, zinc-air, nickel-metal hydride, lead acid, or other battery chemistry. As appreciated in the at, the battery cells 16C are electrochemical devices configured to store electrical energy and release the same as needed. In the representative configuration of FIG. 1, the battery electric system 14 includes a DC voltage bus 18 having positive (+) and negative (−) voltage rails, across which is provided a DC voltage (VDC). The battery electric system 14 also includes a traction power inverter module (TPIM) 19 connected to the DC voltage bus 18, and a polyphase alternating current (AC) voltage bus 21 (VAC) that is electrically connected to the TPIM 19.

As understood in the art, switching operation of a power inverter such as the illustrated TPIM 19 is performed to convert DC power to AC power or vice versa as needed. For instance, when energizing a stator (S) 22 of a rotary electric machine 24 having the stator 22 and a rotor (R) 23 separated by an intervening airgap 26, ON/OFF state control of individual IGBTs, MOSFETs, or other semiconductor switches of the TPIM 19 is used to sequentially generate an AC output voltage to the individual phase windings of the stator 22. Machine rotation occurring in response to field interaction between the stator 22 and the rotor 23 ultimately generates torque (arrow $T_M$) on a rotor shaft 230 when powering a driven load (L) 28. By way of example, the driven load 28 may include one or more of the road wheels 13 of a representative motor vehicle, with one road wheel 13 depicted solely for illustrative simplicity, or alternatively a drive belt, pulley, hoist, or other device.

The battery electric system 14 of FIG. 1 also includes one or more additional electrical components each connected to the DC voltage bus 18 and providing a respective function, some of which are maintained by the present teachings during TRP fault modes. In the exemplary configuration of FIG. 1, for instance, such components may include accessory loads, e.g., an air conditioning control module (ACCM) 30 configured to control and electronically regulate the heating, air conditioning, and ventilation functions aboard the mobile platform 12. An electronic transmission range selector (ETRS) 32 may be used as an accessory load to shift a transmission (not shown) of the mobile platform 12, while an auxiliary power module (APM) 34, also referred to in the art as a DC-DC converter, may be used to reduce the voltage level on the DC voltage bus to lower/auxiliary voltage levels ($V_{AUX}$) on an auxiliary DC voltage bus 180, e.g., for delivering electrical power to or receiving electrical power from a connected auxiliary battery ($B_{AUX}$) 124. To circulate coolant (arrow FF) to/through the RESS 16, a chiller system (CS) 36 may be connected to the DC voltage bus IS. Although shown schematically for illustrative simplicity, the chiller system 36 typically includes conductive plates, coolant pumps, conduit, valves, heat exchangers, coolant, and other requisite hardware needed for regulating the temperature of the RESS 16 and its constituent battery modules 160, as appreciated in the art.

Power flow to or from the RESS 16 is regulated herein by a battery controller 50, referred to hereinafter as a battery management system (BMS) 50 as set forth below. To that end, the BMS 50 may transmit switching control signals (arrow $CC_{16}$) to the RESS 16 in response to input signals (arrow $CC_{IN}$). The BMS 50 may receive the input signals (arrow $CC_{IN}$), some of which may be provided by the cell sense boards (CSBs) 42 shown in FIGS. 2 and 3, with the input signals (arrow $CC_{IN}$) including a set of operating values (arrows CC of FIGS. 2 and 3) indicative of measured or estimated temperatures, voltages, currents, states of charge, and/or other electrical or thermal parameters of the RESS 16.

The BMS 50 includes a processor (P), e.g., a central processing unit, microprocessor, application-specific integrated circuit, etc., and sufficient amounts and types of memory (M), including tangible, non-transitory memory such as read only memory, optical, magnetic, flash memory, etc. The BMS 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. In other words, while the BMS 50 is shown in highly simplified form, an actual implementation of the BMS 50 will include the necessary computing and digital signal processing hardware for performing the various monitoring and control tasks set forth herein, along with customary functions of the BMS 50 when controlling operation of the RESS 16 absent the open module/TRP event as addressed by the present solutions.

Referring now to FIG. 2, the RESS 16 of FIG. 1 is shown attached to the DC voltage bus IS, i.e., across respective positive and negative rails HV⁺ and HV⁻ thereof. The RESS 16 is equipped with the switchable architecture 15 to ensure continued operation of the various power components of FIG. 1 in the event of thermal runaway, as well as to power at least limited propulsion functions. When discharging a string of battery cells 16C to power the TPIM 19, the APM 34, and/or the ACCM 30 of FIG. 1, or when charging the battery cells 16C, the presence of an open-circuit fault may lead to a rapid acceleration of the above-described TRP event, largely due to a sudden loss of cooling action of the type typically associated with temperature rise mitigation. Thus, a solution to this particular problem is provided in the non-limiting configuration of FIG. 2 by integrating passive diodes 44 into the construction of the battery modules 160 of FIG. 1 so as to bypass a single open battery module 160, without affecting operation of the remaining battery modules 160.

For simplicity, the RESS 16 of FIG. 2 is depicted with an odd number of battery modules 160, in this instance three such battery modules 160 labeled 160A, 160B, and 160C for clarity. Each battery module 160 includes one or more battery cells 16C. As generally described above, the battery cell 16C is the basic unit of construction of the battery modules 160, with each battery cell 16C having a corresponding anode and cathode, separator materials, and electrolyte enclosed within a battery case, e.g., a flat rectangular pouch, a cylindrical cell, or a prismatic battery cell of the various types commonly used to power battery electric vehicles. When one or more such battery cells 16C are assembled into a protective frame, the resulting structure is that of the illustrated battery modules 160. The RESS 16 is then assembled using one or more battery modules 160.

In the switchable architectures 15 represented in FIG. 2, each battery module 160 includes a respective CSB 42, one or more of the battery cells 16C, and a semiconductor switch, in this instance a low-loss embodiment of the diode 44 such as a Schottky diode. As used herein and in the art, "low-loss" in the context of the diodes 44 refers to a minimal loss of power, e.g., due to wasted heat energy, with the Schottky diode being just one possible embodiment. In the highly simplified non-limiting exemplary embodiment depicted in FIG. 2, in which three of the battery modules 160 are included in the construction of the RESS 16, the low-loss diodes 44 are labeled D1, D2, and D3 for corresponding battery modules 160A, 160B, and 160C. Each respective CSB 42 is in communication with the BMS 50, as represented by double-headed arrows CC, over suitable wired or wireless communications paths 41. Fundamental functions of the CSBs 42 include measurement and reporting to the BMS 50 of battery module 160—specific or battery cell 16C-specific operating values, including corresponding cell voltages, module and/or cell temperatures, etc.

Within each battery module 160A, 160B, and 160C, the battery cells 16C are arranged in series and reduced to a single battery cell 16C solely for the purpose of simplified illustration. In the depicted embodiment, the low-loss diode 44 is connected in parallel with the battery cells 16C. Using an exemplary use scenario, were the battery cell(s) 16C of the battery module 160A of FIG. 2 to experience an open-circuit fault, the diode 44 labeled D1 would conduct. While the voltage contribution of battery module 160A would be temporarily lost until the open-circuit fault has been addressed, the remaining battery modules 160—in this instance the battery modules 160B and 160C—would continue to function. This in turn allows a maximum available DC bus voltage to be supplied across the DC voltage bus IS to the important thermal and/or propulsion systems noted above.

Referring now to FIG. 3, functionality of the switchable architecture 15 of FIG. 2 may be expanded to active control via an alternative switchable architecture 150. As with the FIG. 2 embodiment, each battery module 160 includes a respective CSB 42 and one or more battery cells 16C, with the battery modules 160A, 160B, and 160C in communication with the BMS 50 as described above. In lieu of the simple low-loss diodes 44 D1, D2, and D3 of FIG. 2, however, the switchable architecture 150 of FIG. 3 employs active semiconductor switches 144, e.g., power MOSFETs in the non-limiting configuration of FIG. 3. For clarity, the active semiconductor switches 144 of the battery modules 160A, 160B, and 160C are respectively labeled S1, S2, and S3.

In the exemplary embodiment of FIG. 3, the CSBs 42 detect the open-circuit condition, e.g., via current or voltage sensing and threshold comparisons as appreciated in the art, and thereafter control the state of the ON/OFF state of a corresponding semiconductor switch 144. A gate driver circuit (G) 43 may be connected to a corresponding gate of the semiconductor switch 144 in order to power the gate of the illustrated MOSFETs as active diodes, with low voltage drops in the context of the present disclosure. Although the details of the gate driver circuit 43 are omitted for illustrative simplicity and clarity, one may employ any suitable drive circuitry in actual implementation, e.g., a flyback DC-DC converter (not shown) may be used to provide suitable input-output isolation. Thus, the particular embodiment of FIG. 3 provides the potential for lower losses, albeit at the expense of introducing the complexity of active switching control of the semiconductor switches 144 and the associated gate driver circuit 43.

Referring to FIG. 4, in yet another embodiment, the RESS 16 of FIG. 1, shown as RESS 16A, may be configured in a "split-pack" arrangement That is, the RESS 16A may include a first battery pack 16PA and a second battery pack 16PB, also labeled as packs A and B for clarity. Each of the respective first and second battery packs 16PA and 16PB includes constituent battery cells 16C as described above, with the first and second battery packs 16PA and 16PB effectively functioning as the battery modules 160 of FIG. 1. A switchable architecture 250 provides programmed mitigation of the above-described TRP problem, as well as selective connection of the first and second battery packs 16PA and 16PB in a series or parallel configuration. For example, the respective first and second battery packs 16PA and 16PB may be selectively connected in series to enable DC fast charging at a higher voltage level than that of the parallel connection, as appreciated in the art. Although the voltage capability of the first and second battery packs 16PA and 16PB may vary with the application, a representative configuration for automotive use includes 400-500V from each one of the first and second battery packs 16PA and 16PB, such that the series configuration enables 80V-1000V DC fast charging.

In the illustrated representative embodiment of FIG. 4, the RESS 16 is equipped with fuses F1 and F2 arranged as shown, and with a plurality of semiconductor switches. Although omitted from FIG. 4 for illustrative clarity, the fuses F2 are connected to a respective power electronic device, e.g., individual auxiliary power units, inverters, onboard charging modules, etc., as appreciated in the art. Due to the number and associated functions of the semiconductors and their functional associated with one of the battery packs 16PA or 16PB, the semiconductor switches are nominally labeled as SA1, SA2, SA3, SA4, and PCA, and SB1, SB2, SB3, SB4, and PCB, as well as additional pyrotechnic fuses ("pyro fuses") P1 and P2, and positive and negative connections to an onboard diagnostics control module (OBDCM) for control of an associated onboard charging module not otherwise being germane to the present teachings. Current sensors (S) 29 in communication with the BMS 50 of FIGS. 1-3 are configured to measure a pack current flowing into or out of a given one of the battery packs 16PA or 16PB, with the included BMS 50 omitted from FIG. 4 for simplicity. A DCFC receptacle 70 is connected to the RESS 16A via the switches SA3 and SB3, with the connection protected by fuse F1.

In this configuration, the switches PCA and SA1 used for pre-charge and connection of the battery pack 16PA may be replaced with a semiconductor switch 244A in the form of a solid-state relay (SSR1). Similarly, the switches PCB and SB1 may be replaced with another semiconductor switch 244B in the form of another solid-state relay (SSR2), with switches SA4 and SB4, possibly separated by a fuse F3, combined into still another semiconductor switch 244C (solid-state relay SSR3). As appreciated in the art, solid-state relays, also referred to in the art as power electronic switches, are integrated electronic switching devices able to switch between ON and OFF conducting states in response to an applied voltage. SSRs switch far more quickly than electromechanical relays, by several orders of magnitude, due largely to the absence of movable components within the SSR. As an SSR may be implemented to open in response to, e.g., an open-circuit condition, and thus could be implemented as part of the present module-level TRP mitigation efforts, in this case without requiring passive diodes as in the embodiment FIG. 2.

By way of example and not of limitation, consider an illustrative scenario in which battery pack 16PA experiences a TRP event of the type contemplated herein. The semiconductor switch 244A (SSR1) could immediately open in response to an open-circuit condition of one of the battery cells 16C or the full battery pack 16PA. This may occur in possible combination with measurements from the current sensors 29. That is, when the battery cells 16C of the battery pack 16PA are connected in series, an open-circuit state will produce a zero current reading into or out of the battery pack 16PA. In response, the semiconductor switch 244A (SSR1), the semiconductor switch 244C (SSR3), i.e., the series switch in the illustrated split-pack arrangement, and the switch SA2 could all be commanded open. A similar operation could be performed in the event of an open-circuit state or TRP event of the battery pack 16PB, in this instance by leaving battery pack 16PA online to power the various thermal regulation components shown in FIG. 1 with a full battery output voltage from the healthy/non-faulted battery pack, in this instance battery pack 16PA, to power connected accessory loads, and to provide partial propulsion or "limp home" capabilities. In such a representative scenario, the battery pack 16PB is disconnected by operation of the semiconductor switch 244B (SSR2) and switch SB2. Depending on whether the RESS 16A is charging or discharging at the time of the open-circuit/TRP event, other switches may be opened or closed as needed, such as by opening switches SA3 or SB3 during a DCFC event. Thus, the series/parallel architecture of FIG. 4 may be used to implement the present TRP mitigation control efforts within the scope of the present disclosure.

As will be appreciated by those skilled in the art, the foregoing disclosure enables a method for constructing the RESS 16. In general, such a method includes connecting a respective semiconductor switch 44 or 144 in parallel with the at least one battery cell 16C of each respective one of the multiple battery modules 160, e.g., as shown in FIGS. 2 and 3, such that the respective semiconductor switch is configured to conduct an electrical current during a TRP event of the RESS 16 in which at least one battery cell 16C of one of the multiple battery modules 160 is in an open-circuit state, thereby automatically bypassing the battery module 160 having the open-circuit state during the TRP event. The method further includes electrically connecting the multiple battery modules 160 together to construct the RESS 16.

The method may also include connecting a respective CSB 42 to each of the multiple battery modules 160, with each CSB configured to measure and transmit a set of battery cell operating values (arrows CC of FIGS. 2 and 3) to the BMS 50 in communication with the RESS 16. Connecting the respective semiconductor switch 44 in parallel with the at least one battery cell 16C of each respective one of the multiple battery modules 160 may include arranging a solid-state relay, such as SSR3 of FIG. 4, between the first battery pack 16PA and the second battery pack 16PB of the RESS 16A, with the solid-state relay (SSR3) being operable for connecting the respective first and second battery packs 16PA and 16PB in series to enable a DC fast-charging operation of the RESS 16A, e.g., via the DCFC receptacle 70 and an offboard charging station (not shown).

The foregoing disclosure provides various hardware and software solutions to maximizing an available DC bus voltage during thermal runaway such as might occur during the open-circuit faults described above. Embodiments that physically integrate passive or active switching functions into the battery modules 160 or battery cells 16C thereof thus enable faulted battery modules 160 to share available cooling, with active embodiments in particular enabling further loss reduction during bypassed operation of the RESS 16. When used with an odd number of battery modules 160, the present teachings likewise provide advantages relative to default 50% bypass fused or switch-based mitigation efforts as noted above. These and other advantages will be readily appreciated by those skilled in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A rechargeable energy storage system (RESS) connectable to one or more electrical components, the RESS comprising:
   a battery controller; and
   a plurality of battery modules, each respective battery module of the plurality of battery modules having:
      one or more battery cells;
      a cell sense board (CSB) in communication with the battery controller, and configured to measure and transmit a set of battery cell operating values to the battery controller; and
      a semiconductor switch connected in parallel with the one or more battery cells within the respective battery module, and configured to conduct an electrical current during a thermal runaway propagation (TRP) event in which the one or more battery cells of the respective battery module are in an open-circuit state, thereby automatically bypassing the one or more battery cells having the open-circuit state while the one or more battery cells of the remaining battery modules provide the electrical current to the one or more electrical components to cool the RESS during the TRP event.

2. The RESS of claim 1, wherein the semiconductor switch includes a diode.

3. The RESS of claim 2, wherein the diode is a Schottky diode.

4. The RESS of claim 2, wherein the semiconductor switch includes a MOSFET and the diode is an integral component of the MOSFET.

5. The RESS of claim 4, wherein the battery controller is configured to turn on the MOSFET in response to detection of the open-circuit state by the CSB.

6. The RESS of claim 1, wherein the plurality of battery modules includes a first plurality of battery modules arranged in a first battery pack and a second plurality of battery modules arranged in a second battery pack, and wherein the RESS is configured, using the semiconductor switch, to selectively connect the first battery pack and the second battery pack in a series-connected configuration, and to selectively disconnect the first battery pack and the second battery pack from each other in response to the open-circuit state.

7. A battery electric system comprising:
   a direct current ("DC") voltage bus;
   at least one electrical component connected to the DC voltage bus, wherein the at least one electrical component includes at least one of a chiller system, an air conditioning control module (ACCM), or an auxiliary power module (APM);
   a battery controller; and
   a rechargeable energy storage system (RESS) connected to the DC voltage bus, wherein the RESS includes a plurality of battery modules, each respective battery module of the plurality of battery modules having:
      one or more battery cells;
      a cell sense board (CSB) in communication with the battery controller, and configured to measure and transmit a set of battery cell operating values to the battery controller; and
      a semiconductor switch connected in parallel with the one or more battery cells within the respective battery module of the plurality of battery modules, and configured to conduct an electrical current during a thermal runaway propagation (TRP) event in which the one or more battery cells of the respective battery module of the plurality of battery modules are in an open-circuit state, thereby automatically bypassing the one or more battery cells having the open-circuit state while the one or more battery cells of the remaining battery modules provide the electrical current to the chiller system, the ACCM, and/or the APM for thermal regulation of the battery electric system during the TRP event.

8. The battery electric system of claim 7, wherein the RESS is configured for use aboard a motor vehicle having, as the at least one electrical component, an electric propulsion motor and an accessory load, and the RESS comprises a solid-state relay positioned between a first battery pack and a second battery pack of the RESS, and wherein in response to the open-circuit state in one of the first battery pack or the second battery pack, the battery controller is configured to:
   isolate the first battery pack or the second battery pack experiencing the open-circuit state by selectively opening the solid-state relay; and
   thereafter power the accessory load and/or provide limited propulsion capabilities to the motor vehicle via the electric propulsion motor.

9. The battery electric system of claim 7, wherein the at least one electrical component includes an electric propulsion motor of a motor vehicle and a traction power inverter module (TPIM), and wherein the semiconductor switch provides the electrical current to the electric propulsion motor via the TPIM for propulsion of the motor vehicle during the TRP event.

10. The battery electric system of claim 7, wherein the semiconductor switch includes a diode.

11. The battery electric system of claim 10, wherein the diode includes a Schottky diode.

12. The battery electric system of claim 7, wherein the semiconductor switch includes a MOSFET configured, in response to a switching control signal, to function as a low-loss diode.

13. The battery electric system of claim 12, wherein the battery controller is configured to transmit the switching control signal to a gate of the MOSFET via a gate drive circuit in response to detection of an open-circuit condition of at least one of the battery cells by the CSB.

14. The battery electric system of claim 7, wherein the plurality of battery modules includes a first plurality of battery modules arranged in a first battery pack and a second plurality of battery modules arranged in a second battery pack, wherein the RESS is configured, in response to a series mode selection signal from the battery controller, to selectively connect the first battery pack and the second battery pack in a series-connected configuration using the semiconductor switch to enable a DC fast-charging operation of the RESS.

15. A method for constructing a rechargeable energy storage system (RESS) having multiple battery modules, each of the multiple battery modules having a plurality of battery cells, the method comprising:
   connecting a respective semiconductor switch in parallel with the battery cells of each respective one of the multiple battery modules, such that the respective semiconductor switch is configured to conduct an electrical current during a thermal runaway propagation (TRP) event of the RESS in which at least one of the battery cells of one of the multiple battery modules is in an open-circuit state to automatically bypass the one of the multiple battery modules having the open-circuit state during the TRP event; and
   electrically connecting the remaining multiple battery modules together to construct the RESS.

16. The method of claim 15, further comprising connecting a respective cell sense board (CSB) to each of the multiple battery modules, wherein the respective CSB is configured to measure and transmit a set of battery cell operating values to a battery controller in communication with the RESS.

17. The method of claim 15, wherein connecting the respective semiconductor switch in parallel with the battery cells of each respective one of the multiple battery modules includes connecting a respective MOSFET in parallel with at least one of the battery cells.

18. The method of claim 15, wherein connecting the respective semiconductor switch in parallel with the battery cells of each respective one of the multiple battery modules includes connecting a respective passive low-loss diode in parallel with at least one of the battery cells.

19. The method of claim 15, wherein connecting the respective semiconductor switch in parallel with the battery cells of each respective one of the multiple battery modules includes arranging a solid-state relay, as the respective semiconductor switch, between a first battery pack and a second battery pack of the RESS, the solid-state relay being operable for connecting the first battery pack and the second battery pack in series to enable a DC fast-charging operation of the RESS.

20. The RESS of claim 1, wherein the one or more electrical components includes at least one of a chiller system, an air conditioning control module (ACCM), or an auxiliary power module (APM), and wherein the one or more battery cells having the open-circuit state is bypassed such that the remaining battery cells supply the electrical current to the one or more of the chiller system, the ACCM, or the APM to cool the RESS during the TRP event.

\* \* \* \* \*